Oct. 8, 1963  E. P. TOMASZEK ETAL  3,106,100
REGULATED TOROIDAL ACTUATOR WITH OVERSPEED CONTROL
Filed Oct. 16, 1961  4 Sheets-Sheet 3

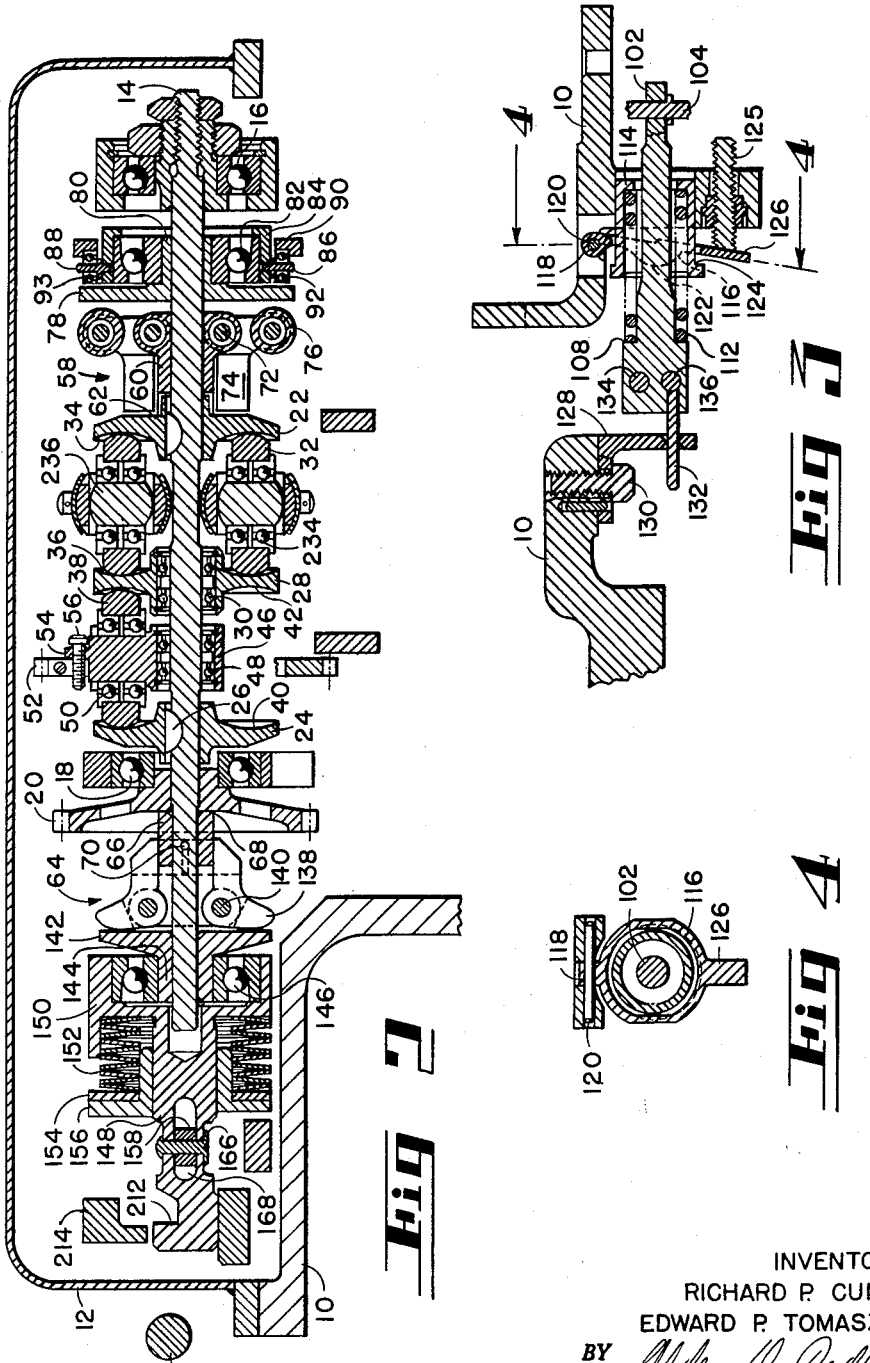

INVENTORS.
RICHARD P. CUNY
EDWARD P. TOMASZEK
BY
ATTORNEYS.

Oct. 8, 1963 E. P. TOMASZEK ETAL 3,106,100
REGULATED TOROIDAL ACTUATOR WITH OVERSPEED CONTROL
Filed Oct. 16, 1961 4 Sheets-Sheet 4
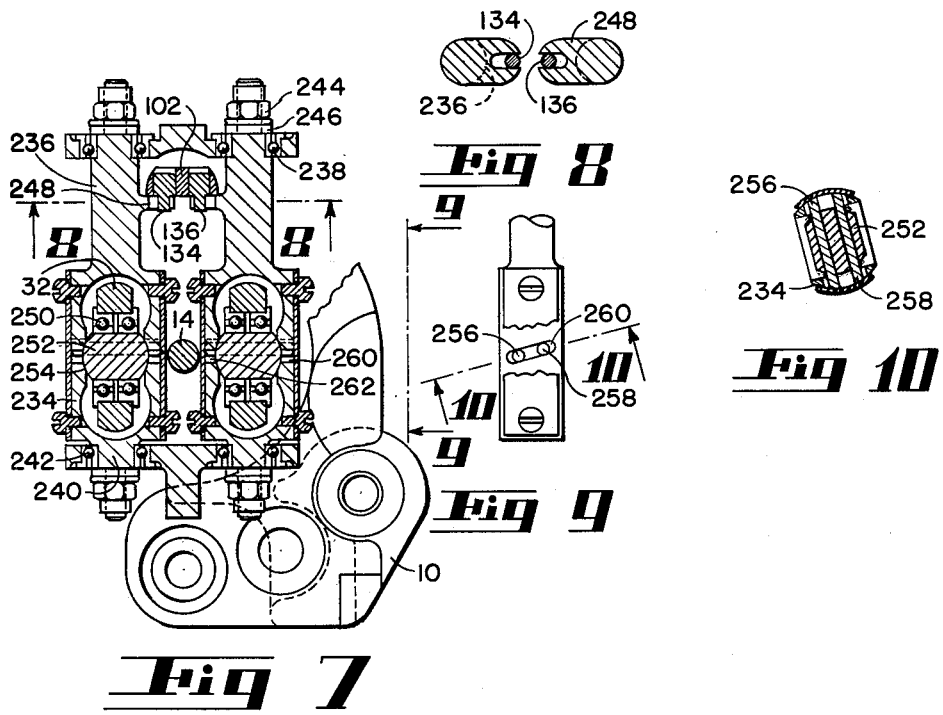
INVENTORS.
RICHARD P. CUNY
EDWARD P. TOMASZEK
BY
ATTORNEYS.

United States Patent Office 3,106,100
Patented Oct. 8, 1963

3,106,100
REGULATED TOROIDAL ACTUATOR WITH
OVERSPEED CONTROL
Edward P. Tomaszek, Shelton, and Richard P. Cuny, Trumbull, Conn., assignors to Avco Corporation, Cincinnati, Ohio, a corporation of Delaware
Filed Oct. 16, 1961, Ser. No. 145,381
19 Claims. (Cl. 74—190.5)

This invention relates to drive systems, and more particularly to a toroidal actuator having speed regulating and overspeed protective devices for controlling a drive.

In many drive systems it is essential that output speeds be maintained relatively constant; for example, in a drive for an alternating current generator demands for an accuracy of 1% are not unusual. A serious problem is created where the power source for the drive operates at widely varying speeds, as will be the case where the apparatus is used in aircraft or automotive vehicles, and drive power is derived from the engine shaft. In such an environment, a system must be provided which will respond rapidly to large speed changes and which will be relatively simple and free from the likelihood of failure.

It is an object of this invention, therefore, to provide an actuator useful in controlling the speed of a drive which will be simple and accurate.

Another object of this invention is to provide a toroidal-type actuator having an output speed which is a function of deviation of input shaft speed from a predetermined rate.

Another object of this invention is to provide a speed regulator for a drive, the speed regulator comprising a toroidal actuator whose output velocity and direction are a function of the output speed of the drive.

Still another object of this invention is to provide a toroidal actuator having two driving disks and one driven disk mounted coaxially on a rotatably driven input shaft, the two driving disks being fixed to the input shaft and the driven disk being rotatably mounted intermediate the fixed disks, the rollers in tractive relation between the toroidal race of one driving disk and the driven disk being adjustably mounted, and the rollers in tractive contact between the toroidal race of the other driving disk and the driven disk being mounted in a carrier ring gear for planetary rotation about the shaft, and to provide unique speed-sensing means for regulating the position of the adjustable rollers and overspeed control means for disconnecting the ring gear in response to an overspeed condition, both the overspeed and speed-sensing means being mounted on the input shaft.

Another object of this invention is to provide a toroidal actuator for controlling a drive system, said toroidal actuator including a plurality of disks having toroidal races with rollers therebetween, speed-regulating and overspeed control devices being mounted on a shaft common with said toroidal actuator, operation of one of said devices providing the pre-loading for said actuator.

Another object of this invention is to provide a speed-governor device for a toroidal actuator, operation of said speed-governing device at a predetermined speed serving to place the rollers and disks of said actuator in traction.

Another object of this invention is to provide a speed-responsive device for an actuator which operates as a slip clutch for the actuator upon a predetermined deviation of speed.

Generally, toroidal drives include a driving disk and a driven disk each having opposing toroidal races, with a set of rollers in tractive relation therebetween. The ratio of the speed of one disk to the speed of the other is determined by the relative position of the rollers with respect to the axes of the disks. This invention provides a toroidal actuator for controlling the speed of a drive. The toroidal actuator includes novel means for automatically adjusting the position of the rollers within the actuator to maintain a constant output speed for the drive, and for automatically disconnecting the actuator from the drive in response to an overspeed condition.

For more complete understanding of the precise nature of this invention, reference should now be made to the following specification and to the accompanying drawings in which:

FIG. 2 is a cross section taken through the line 2—2 in FIG. 1;

FIG. 3 is a cross-sectional view of portion of the governor arrangements;

FIG. 4 is a section taken through the line 4—4 in FIG. 3;

FIG. 7 is a cross-sectional view showing the arrangement of the adjustable rollers;

FIGS. 8, 9, and 10 are views of various portions of FIG. 7; and

Figure 11:
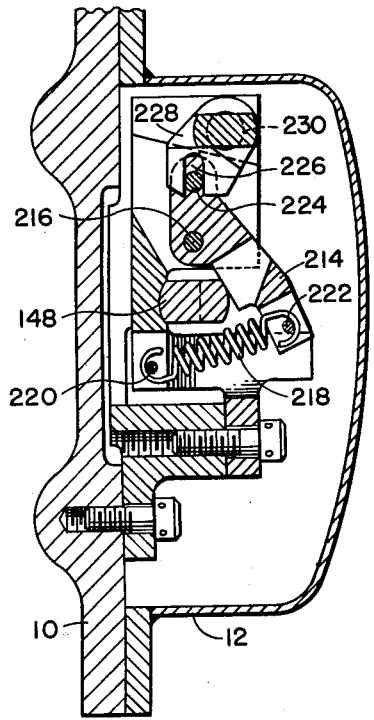
Figure 5:
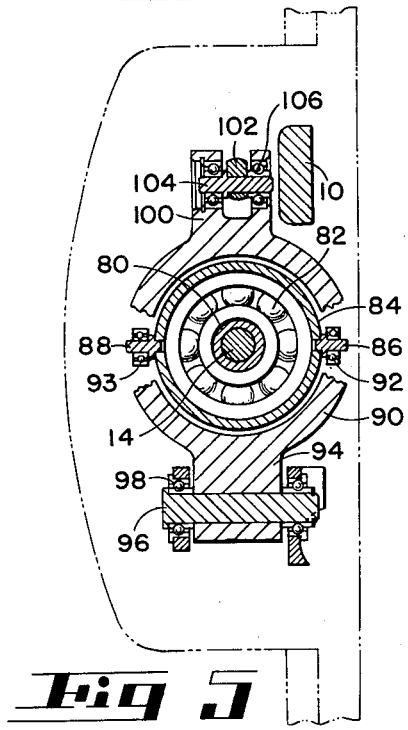
FIG. 5 is a cross-sectional view showing additional portions of the governor arrangement.

FIG. 11 is a view showing the resetting arrangement of the overspeed control.

For the purpose of facilitating a clearer description of this invention, certain expressions used in the specification are defined as follows:

A "roller axis" is that axis about which a roller rotates on the races of the disks.

The "contact axis" of a roller is that axis joining the points of contact of a roller with the races of the disks; the contact axis is that axis about which the position of the rollers is altered by a "steering" action.

"Axis of precession" of a roller is that axis about which the rollers are shifted or tilted to change the speed ratio between the various driving and driven disks.

The toroidal actuator for regulating the output speed of a drive system is secured from a support structure 10, which preferably may include the housing of the drive system which is being regulated. A cover 12 encloses the actuator. As will be observed, the configuration of support structure 10 provides a compact, rigid and rugged support; but its details are not pertinent to the invention and hence only general reference will be made to it.

The actuator includes an input shaft 14 rotatably supported from the support structure 10 between ball bearings 16 and 18, and the shaft is driven from the drive system through a fixedly mounted input gear 20.

Two driving disks 22 and 24 are mounted on the shaft 14 and are constrained from rotation relative to it by means of slot and key arrangements 26. The longitudinal positions of the disks 22 and 24 on the shaft 14 are fixed in a manner to be described.

A driven disk 28 is mounted on the shaft 14 intermediate the driving disks 22 and 24 but is freely rotatable with respect to the shaft 14 on bearings 30. A pair of adjustable rollers 32 is positioned for tractive engagement with the opposed toroidal races 34 and 36 of the disks 22 and 28, respectively, while a second set of three non-adjustable rollers 38 is mounted in tractive relationship with the opposed races 40 and 42 of the disks 24 and 28, respectively. As will be described in more detail below, the rollers 32 are supported in such a manner that their angular positions are each adjustable on the axes of precession and the contact axes.

The support for the rollers 38 comprises a carrier 44 rotatably mounted on the shaft 14 by means of bearings 48 and having three radially extending legs 46. Each of the rollers 38 is rotatably mounted on a respective leg 46 on bearings 50. An output ring gear 52 is secured to a flange 54 on the carrier 44 by means of screws 56.

For the purpose of regulating the speed of the input shaft 14 (and the drive system under control of the actuator), a flyweight governor, generally indicated at 58, is secured to the shaft 14 intermediate the disk 22 and the bearings 16. The flyweight governor 58 includes two support members 60 slidably positioned on and radially extending from the shaft 14. As will be more fully described below, support members 60 slide on the shaft 14 under the influence of the flyweight governor 58 and shoulders 62 on the support members abut the rear of the disk 22. A flyweight overspeed control device, generally indicated at 64, is positioned at the other end of the shaft 14, and it includes flyweight support members 66. The flyweight support members 66 are fixed on the shaft 14 by means of a pin 70, and the shoulder portions 68 of the support member 66 provide a fixed stop for the gear 20 and for the several rollers and disks.

The flyweight support members 60 for the governor 58 are each provided with a pin 72 from which an L-shaped flyweight 74 is pivoted. It will be noted that the flyweight 74 has one leg lying generally parallel to the axis of the shaft 14 and another extending radially with respect thereto. The end of each of the radially extending legs is provided with a roller 76.

A movable governor disk 78 having a central hub 80 is angularly fixed on the shaft 14 intermediate the flyweight 74 and the bearings 16. The hub 80 carries roller bearings 82 on which a cylindrical pivot support member 84 is mounted. The cylindrical pivot support member 84 carries radially extending pins 86 and 88 to which an O-shaped actuating member 90 is pivotally secured in bearings 92 and 93. The O-shaped actuating member 90 has a downwardly projecting extension 94 pivotally supported from the support 10 by means of a pin 96 mounted in bearings 98. The actuating member 90 also has an upwardly projecting extension 100 to which a rod 102 is connected by means of a pin 104 and bearings 106.

The rod 102 terminates in an enlarged end providing a shoulder 108 against which one end of a spring 112 bears. A cup 114 apertured to permit passage of the rod 102 houses the other end of the spring. An O-shaped yoke 116 encircles the cup 114 and is provided with an extension 118 which is pivotally connected at pin 120 to the housing. The O-shaped yoke 116 is provided with a cam-like surface at 122, which is brought to bear against a lip 124 on the cup 114 by means of an adjusting screw 125 which bears against a lower projection 126 of the yoke 116 thereby placing the spring adjustably under compression. The degree of compression and the characteristics of the spring 112 govern the speed of operation of the system.

For the purpose of supporting and guiding the end of the rod 102, there is provided an L-shaped bracket 128 secured to a portion of the support 10 by means of a screw 130. A guide pin 132 extending from the rod 102 projects through an appropriate aperture in the bracket 128. A pair of pins 134 and 136 projecting at right angles to the rod 102 provide the steering action for the rollers 32 in a manner which will hereinafter be described.

In the operation of the governor assembly thus far described, rotation of the input shaft 14 through the input gear 20 produces centrifugal forces on the flyweights 74 causing them to rotate outwardly from the shaft on the pivots 72. This action causes the rollers 76 to bear against the disk 78, and two actions are produced. First, the shoulders 62 on the flyweight supports 60 are driven against the rear of disk 22 causing the entire system of rollers and disks to be put in traction. It will be observed that this feature provides an automatic slip clutch for the actuator upon the occurrence of an underspeed condition or on starting, and thus provides a safety feature for the equipment whereby it is unloaded automatically when the drive is shut down. Furthermore, this is the only "preloading" of the rollers, and hence the actuator will not operate until a given shaft speed is achieved. Second, when the rollers 76 bear against the disk 78, longitudinal movement of the disk 78 results and the O-shaped yoke 84 is pivoted on pin 96, thereby displacing the rod 102 from left to right as shown in the drawings. Since the position of one end of the spring 112 is fixed by the cup 114, the rod 102 will move against the compression of the spring 112 until the forces exerted by the flyweights are equalized. The shaft will then tend to run at the speed determined by the characteristics of spring 112 and as further determined by the adjustment provided by the adjusting screw 125.

The overspeed control device 64 includes generally L-shaped flyweights 138 pivoted from the members 66 by means of pins 140. A disk member 142 having a central hub 144 extending along the shaft 14 is slidably positioned on the shaft. The central hub portion 144 carries bearings 146 on which is mounted a longitudinally movable overspeed shaft 148. The overspeed shaft 148 includes an enlarged end portion 150 adjacent the shaft 14, one side of which contains the outer race of the bearings 146 and the other side provides an annulus for housing one end of a spring 152. The other end of the spring is retained against the shoulder 154 of a sleeve 156 attached to the support 10. The overspeed shaft 148 slidably projects through the sleeve 156.

Movement of the overspeed shaft 148 is arranged to actuate a linkage including a lever 158 pivoted from the housing at 160 and a lever 162 pivoted from the housing at 164. This is accomplished by means of a pin 166 positioned within an aperture 168 in plunger 148, the pin 166 engaging the lever 158 in a slot 170. Similarly, a pin 172 on one end of the lever 162 is engaged within a slot 174 in the other end of the lever 158. The other end of the lever 162 is pivotally connected by means of a pin 176 to a plunger 178.

Figure 1:
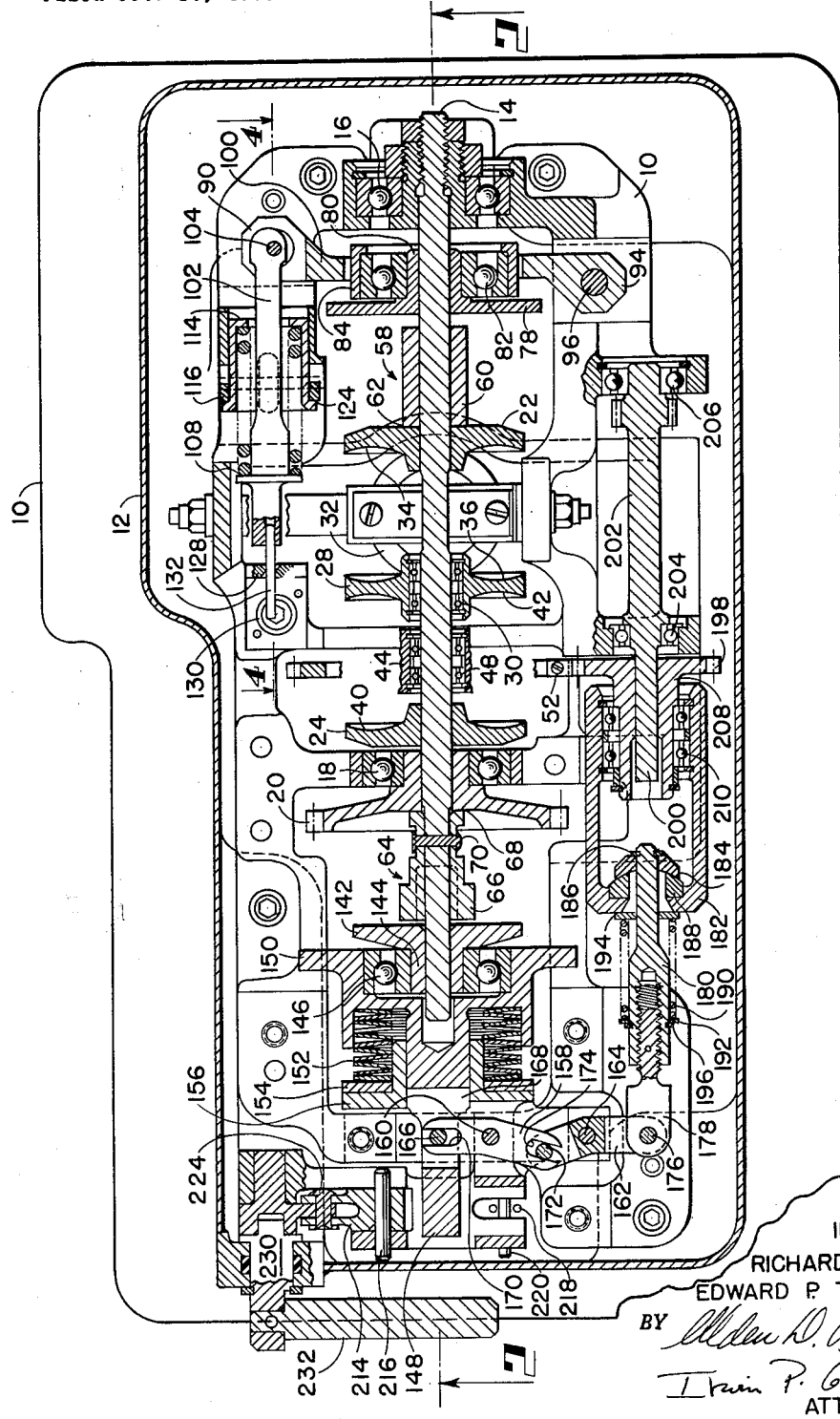
FIG. 1 is a cross-sectional view showing the over-all arrangement of the actuator, certain portions being cut away for the sake of clarity.
Figure 6:
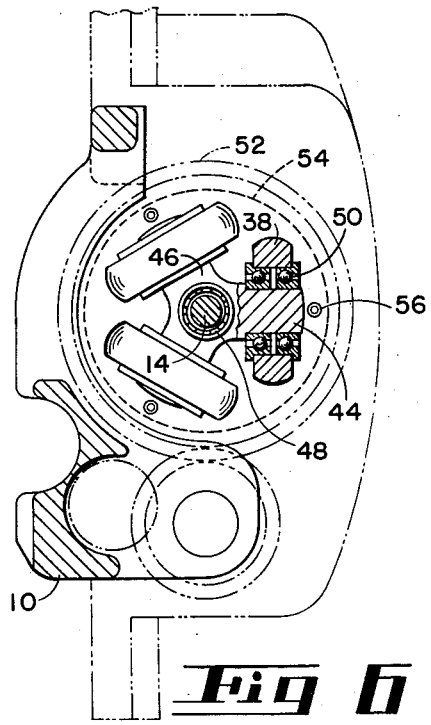
FIG. 6 is a view showing the mounting of the non-adjustable rollers.

Upon movement of the overspeed shaft 148 from right to left, as seen in FIG. 1 of the drawings, the lever 162 is caused to rotate on the pin 164 in a clockwise direction and the plunger 178 then moves from right to left. The plunger 178 is adjustably threaded into a rod 180, the opposite end of which extends through an aperture in a sleeve 182 adapted for sliding movement relative to the housing.

A washer 184 maintained on one end of the rod 180 by means of a snap ring 186 is brought to bear against a disk 188 positioned in a seat in the interior of sleeve 182 by means of the pressure exerted by a spring 190 positioned on the other end of the rod 180. The position of the spring 190 on the rod 180 is maintained between two washers 192 and 194 by means of a snap ring 196.

A gear 198 is supported on an extension 200 of a shaft 202 which is rotatably supported in bearings 204 and 206. The gear 198 is normally positioned in engagement with the output gear 52 under the pressure of spring 190, and is coupled to the drive system under control and provides the speed adjustment for that system. That is to say, rotation of gear 198 increases or decreases the speed of the drive depending on direction of rotation. The gear 198 is provided with a longitudinally extending hub portion 208 which is positioned on the extension 200 in a sliding relationship thereto. The hub 208 is rotatably supported within the sleeve 182 on bearings 210. The use of the spring 190 provides the means for engaging the gear 198 with the gears of the controlled system when not properly aligned.

Rotation of the shaft 14 causes the flyweights 138 to move outward and bear against disk 142, causing the overspeed shaft 148 to move longitudinally against the force of spring 152. When the force of the spring 152 is overcome upon the occurrence of an overspeed condition, the spring suddenly compresses and the shaft 148 causes the rotation of the levers 158 and 162 and the longitudinal motion of the plunger 180. Movement of the plunger 180 carries with it the sleeve 182 and the gear 198, thus disengaging the gear 198 from the output gear 52 and from the drive system under control.

It will be recognized that with this arrangement the drive system under control should be provided with means for reducing the speed of the drive in response to operation of the overspeed control device and the disconnection of the gear 190. In an embodiment actually reduced to practice, a toroidal drive having a plurality of rollers in traction between opposed toroidal races was provided with adjustments for steering on the contact axes and on the axes of precession as a result of actuator operation. Also provided was a spring biasing the steering of those rollers toward a minimum speed position. Hence upon disengagement of the actuator from the drive at the gear 198, the spring on the drive automatically steered the rollers to a minimum drive speed condition. Upon the occurrence of this event, the speed of the governor was insufficient to maintain the actuator rollers in traction.

The overspeed device is arranged so that when the gear 198 is disengaged from the gear 52, it cannot be re-engaged except by a manual resetting. For this purpose the overspeed shaft 148 is provided with a recess 212 in which a spring-loaded stop link 214 falls when the plunger is moved from right to left.

The spring-loaded stop link 214 is pivoted from the support 10 by means of a pin 216 and is maintained in a loaded condition against the end of the plunger 148 by means of a spring 218 extended between a pin 220 on the housing and a pin 222 at the end of the lever 214. When the overspeed shaft 148 moves from right to left, the stop link 214 falls under the pressure of the spring 218 into the recess 212 thereby preventing the return of the plunger to its original position after the overload condition has been removed.

It will be observed that a pin 224 is also provided in the other end of the lever 214 and this pin rides within a slot 226 in a linkage 228 which is fixed to a shaft 230. When the lever 214 is rotated into the recess, the linkage 228 is rotated by the pin 224, thereby rotating the shaft 230 in a counter-clockwise direction. A handle 232 fixed to the shaft 230 is provided for rotating the shaft 230 back to its original position and thereby pivoting the stop link 214 to a position out of the recess 212 and permitting the plunger 148, under the influence of the spring 152, to return to its normal speed position and re-engage the drive gear.

The general arrangement of the steering mechanism for the rollers 32 is described in detail and claimed in the copending application of Tomaszek et al., Serial No. 97,282, filed March 21, 1961, now Patent No. 3,030,817, entitled "Toroidal Actuator." Briefly, the steering mechanism for each of the rollers 32 comprises a yoke 234 having integral shafts 236 and 240 supported from the top and botom of the housing in bearings 238 and 242, respectively. Nuts 244 and bearing retaining washers 246 maintain each yoke in place. Each of the shafts 236 is provided with a radial projection 248, each projection having an aperture for receiving the respective pins 134 and 136 located on the end of the rod 102. Thus, longitudinal displacement of the rod 102 under the influence of the governor 58 will cause the rotation of the yokes 234 on their respective axes.

The rollers 32 are each mounted on bearings 250 to permit free rotation on the roller axis. To permit simultaneous steering and precessing actions, the bearings 250 are in turn mounted on a ball member 252, which in turn is positioned within a contoured portion of the yoke 234, which in effect provides a socket member 254. The main support for the roller is provided by means of two spaced pins 256 and 258 which extend through the ball 252 and through slots 260 and 262 in the opposite walls of the yoke.

The pins 256 and 258 and the slots 260 and 262 disposed at an angle relative to the axis of the input shaft 14 and the length of the slot exceeds the spacing of the pins. Due to this angular relationship, rotation of the yoke 234 on its shafts 236 and 240 brings the surfaces surrounding the slots to bear against the pins 256 and 258 and imparts forces to the pins having one component tending to rotate the roller on its contact axis and another component tending to rotate the roller on its axis of precession. This action results in the movement of the roller on the toroidal races so as to change the driving ratio of the driving disk 22 with respect to the driven disk 28.

Thus there has been produced a toroidal actuator for a drive system which serves several functions. First, the toroidal actuator regulates the speed of the drive under the control of a speed governor, operation of the speed governor also serving as a slip clutch for the actuator; and, second, the invention also provides an overspeed control device with built-in safety features. That is, the overspeed control disengages the drive in response to an overspeed condition, and subsequently causes the slip clutch action of the governor to disengage the rollers of the actuator. One of the unique features of structure permitting the foregoing results with utmost simplicity is the positioning of all of the components of the governor, actuator, and the overspeed control device on a single shaft, namely, the input shaft 14.

It is apparent that many modifications and adaptations of this invention will be available to persons skilled in the art. For example, either the speed regulator or the overspeed device, or both in combination, may be used to put the rollers of the actuator in traction. Furthermore the actuator may be used for controlling other types of drives rather than the toroidal drive with which it was reduced to practice, the only requirement being that some means be provided for returning the drive to a slow speed upon disengagement from the actuator. For example, if the drive is an internal combustion engine and the actuator is connected to the throttle, the throttle might be spring-biased to a minimum speed condition. It is my intention, therefore, that this invention be limited only by the annexed claims as interpreted in the light of the prior art.

What is claimed is:

1. In a regulated toroidal actuator, the combination comprising: a rotatable input shaft; first and second disks coaxially mounted on said input shaft and angularly fixed for rotation therewith; a third disk mounted coaxially with said input shaft intermediate said first and second disks, said third disk being freely rotatable with respect to said input shaft, said first and third disks having first opposed toroidal races and said second and third disks having second opposed races; a first plurality of rollers adjustably mounted for tractive contact with said first opposed races, said first plurality of rollers including adjustment means movable to tilt said first rollers to change the speed ratio of said first disk with respect to said third disk; a second plurality of rollers mounted for tractive contact with said second opposed races, said second plurality of rollers being supported for planetary rotation about the axis of said input shaft, said second rollers being carried in a ring gear; output gearing engageable with said ring gear; first and second centrifugal speed governors angularly fixed on said shaft for rotation therewith, each of said centrifugal speed governors assuming a radial postion with respect to said shaft determined in accordance with the speed of said shaft, said first centrifugal speed governor being operatively connected to said adjustment means for causing said first plurality of rollers to tilt in response to changes in speed of said shaft; said second speed governor being operatively connected to said output gearing for disengaging said gearing from said ring gear when the speed of said shaft exceeds a predetermined speed.

2. The invention as defined in claim 1 wherein said centrifugal speed governors include means for increasing the traction between said rollers and said races as the speed of said shaft increases.

3. In a regulated toroidal actuator, the combination comprising: a support; an input shaft rotatably mounted on said support; first and second disks mounted coaxially with respect to said shaft, said disks having opposed toroidal races; a plurality of rollers adjustably mounted between said faces; means for angularly fixing said first disk with respect to said input shaft, said first disk being longitudinally slidable with respect to said input shaft; means for longitudinally fixing the position of said second disk with respect to said input shaft, and means for placing said rollers in traction between the races of said disks and for adjusting the position of said rollers in response to changes in speed of said shaft from a predetermined speed, said means comprising a centrifugal speed-sensing device angularly fixed on said shaft, said device being longitudinally slidable on said shaft, and motion transmitting means responsive to the centrifugal action of said device for longitudinally moving said device against said first disk whereby said first and second disks and said rollers are placed in traction between said device and said means for fixing the longitudinal position of said second disk, and for adjusting said rollers on said races.

4. The invention as defined in claim 3 wherein said motion transmitting means comprises: an O-shaped yoke concentric with said input shaft, said O-shaped yoke having first and second diametrically opposed extensions, one of said extensions being pivoted from said support; a motion transmitting disk having a central hub, said motion transmitting disk being longitudinally movable on said input shaft but being angularly fixed with respect thereto; a sleeve; first and second pins extending diametrically from said sleeve 90 degrees displaced from said extensions, said O-shaped yoke being pivoted from said pins, said sleeve being supported on ball bearings retained between said sleeve and said hub, said motion transmitting disk being longitudinally movable under the influence of said first centrifugal speed-governor device; and means coupling the other extension from said yoke to said adjustable rollers.

5. The invention as defined in claim 3 and output gearing coupled to said rollers and a centrifugal overspeed sensing device also mounted on said input shaft, said overspeed device being operative to disengage said output gearing upon the occurrence of an overspeed condition.

6. The invention as defined in claim 5 wherein said overspeed device is coupled to said output gearing through a motion transmitting device comprising: a second shaft coaxial with said first shaft; a compressible spring; means on said support for retaining one end of said compressible spring; means movable on said first shaft under the influence of said overspeed sensing device for retaining the other end of said spring whereby said spring is compressed under the influence of said overspeed sensing device when overspeed conditions exist and said second shaft is moved to disengage said output gearing.

7. The invention as defined in claim 6, and a coupling between said second shaft and said output gearing, said coupling including an axially movable third shaft; a compressible spring coaxially mounted on said third shaft; a sleeve coaxial with said third shaft, said third shaft extending into said sleeve; said output gearing being supported by said sleeve; retaining means for preventing withdrawal of said third shaft from said sleeve; and means on said third shaft retaining said spring in compression between said retaining means and said third shaft.

8. In a regulated toroidal actuator, the combination comprising: a fixed support; an input shaft rotatably mounted on said support; first and second disks coaxially mounted on said input shaft and angularly fixed for rotation therewith; means for fixing the axial position of said second disk on said shaft, said first disk being axially movable on said shaft; a third disk mounted coaxially with said input shaft intermediate said first and second disks, said third disk being freely rotatable with respect to said input shaft and being axially movable thereon, said first and third disks having first opposed toroidal races, and said second and third disks having second opposed toroidal races; a first plurality of rollers adjustably mounted between said first opposed races and a second plurality of rollers mounted between said second opposed races, said second plurality of rollers being supported for planetary rotation about the axis of said input shaft and being carried in a ring gear; output gearing engageable with said ring gear; adjusting means movable to tilt said first rollers to change the speed ratio of said first disk with respect to said third disk; a centrifugal speed governor device angularly fixed on said shaft adjacent said first disk, said centrifugal speed governor device assuming a radial position with respect to said shaft determined in accordance with the speed of said shaft; and first motion transmitting means responsive to the centrifugal action of said device for longitudinally moving said device against said first disk whereby said disks and said rollers are placed in traction between said device and said means for fixing the axial position of said second disk, said motion transmitting means being drivingly connected to said adjusting means for adjusting said rollers on said races.

9. The invention as defined in claim 8 and a second centrifugal speed governor device mounted on said input shaft, and second motion transmitting means for operatively connecting said second centrifugal speed governor device to said output gearing for disengaging said output gearing from said ring gear upon the occurrence of a predetermined overspeed condition.

10. The invention as defined in claim 9 and means for preventing the re-engagement of said output gearing to said ring gear except by manual reconnection.

11. The invention as defined in claim 9 wherein said second motion transmitting means comprises a second shaft coaxial with said input shaft, said second shaft being coupled to said output gearing; a compressible spring; means fixed on said support for retaining one end of said compressible spring; means fixed on said second shaft for retaining the other end of said spring, said second shaft being longitudinally movable against said spring under the influence of said second centrifugal speed-governing device, said spring having characteristics such that it opposes movement of said shaft until a predetermined force is exceeded whereupon said spring compresses at a rapid rate.

12. The invention as defined in claim 11 and means for preventing the re-engagement of said output gearing to said ring gear except by manual reconnection.

13. The invention as defined in claim 12 wherein said means for preventing the re-engagement of said output gearing to said ring gear except by manual reconnection comprises: a slot on said second shaft transverse to the axis of said shaft and a stop link spring-biased against said shaft adjacent said slot, said stop link dropping into said slot upon movement of said shaft under the influence of said second speed-governor device and preventing said shaft from returning to its normal speed condition under the influence of said compressible spring.

14. The invention as defined in claim 11 wherein the coupling between said output gearing and said second shaft includes a second compressible spring for yieldably engaging said output gearing with said ring gear.

15. The invention as defined in claim 13 and a linkage for manually rotating said locking lever out of said slot for permitting said shaft to return to its original position.

16. The invention as defined in claim 8 wherein said first motion transmitting device comprises: an O-shaped yoke concentric with said input shaft, said O-shaped yoke having first and second diametrically opposed extensions, one of said extensions being pivoted from said support; a motion transmitting disk having a central hub, said motion transmitting disk being longitudinally movable on said input shaft but being angularly fixed with respect thereto; a sleeve; first and second pins extending diametrically from said sleeve 90 degrees displaced from said extensions, said O-shaped yoke being pivoted from said pins, said sleeve being supported on ball bearings retained between said sleeve and said hub, said motion transmitting disk being longitudinally movable under the influence of said first centrifugal speed-governor device, and means coupling the other extension from said yoke to said adjustable rollers.

17. In a toroidal actuator wherein a plurality of rollers is driven between the opposed races of first and second toroids, the combination including speed governor means responsive to angular velocity of one of said toroids, said speed governor means being mechanically connected to said plurality of rollers for adjusting the driving ratio between said races and said rollers, said speed governor means including means for increasing or decreasing the traction of said rollers between said opposed races as a function of velocity.

18. In a regulated toroidal actuator, the combination comprising: a support; an input shaft rotatably mounted on said support; first and second disks mounted coaxially with respect to said shaft, said disks having opposed toroidal races; a plurality of rollers adjustably mounted between said races; means for angularly fixing said first disk with respect to said input shaft, said first disk being longitudinally slidable with respect to said input shaft; means for longitudinally fixing the position of said second disk with respect to said input shaft, and means for placing said rollers in traction between the races of said disks, said means comprising a centrifugal speed-sensing device angularly fixed on said shaft, said device being longitudinally slidable on said shaft, and motion transmitting means responsive to the centrifugal action of said device for longitudinally moving said device against said first disk whereby said first and second disks and said rollers are placed in traction between said device and said means for fixing the longitudinal position of said second disk.

19. The invention as defined in claim 18 and output gearing coupled to said rollers and a centrifugal overspeed device also mounted on said input shaft, said overspeed device being operative to disengage said gearing upon the occurrence of an overspeed condition.

References Cited in the file of this patent
UNITED STATES PATENTS

| | | |
|---|---|---|
| 2,871,714 | Weisel | Feb. 3, 1959 |
| 3,030,817 | Tomaszek et al. | Apr. 24, 1962 |

FOREIGN PATENTS

| | | |
|---|---|---|
| 376,760 | Italy | Nov. 24, 1939 |